(No Model.) 2 Sheets—Sheet 1.
A. J. BATTERSBY.
BICYCLE.
No. 480,166. Patented Aug. 2, 1892.
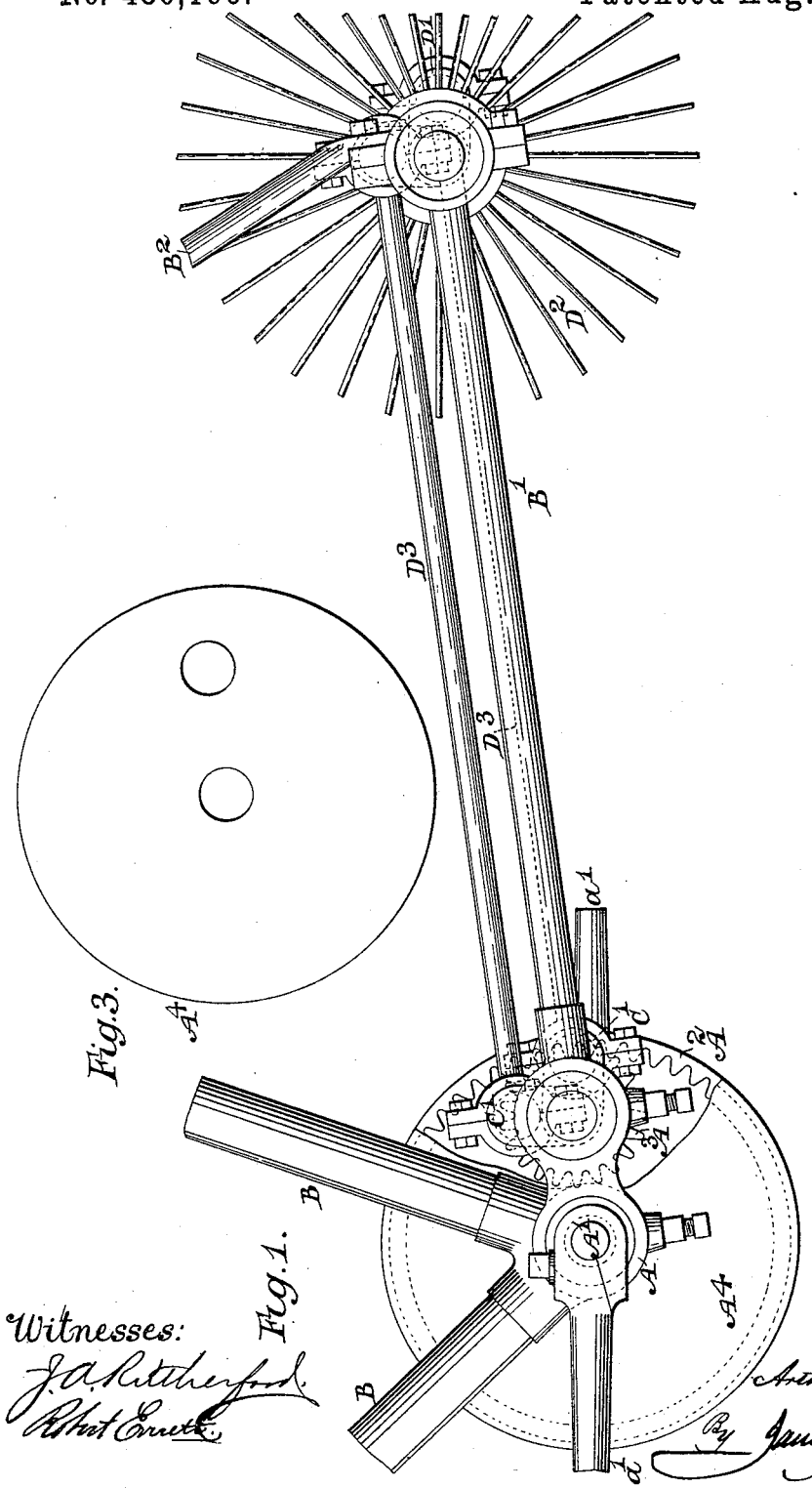
Witnesses:
Inventor.

(No Model.) 2 Sheets—Sheet 2.
A. J. BATTERSBY.
BICYCLE.
No. 480,166. Patented Aug. 2, 1892.
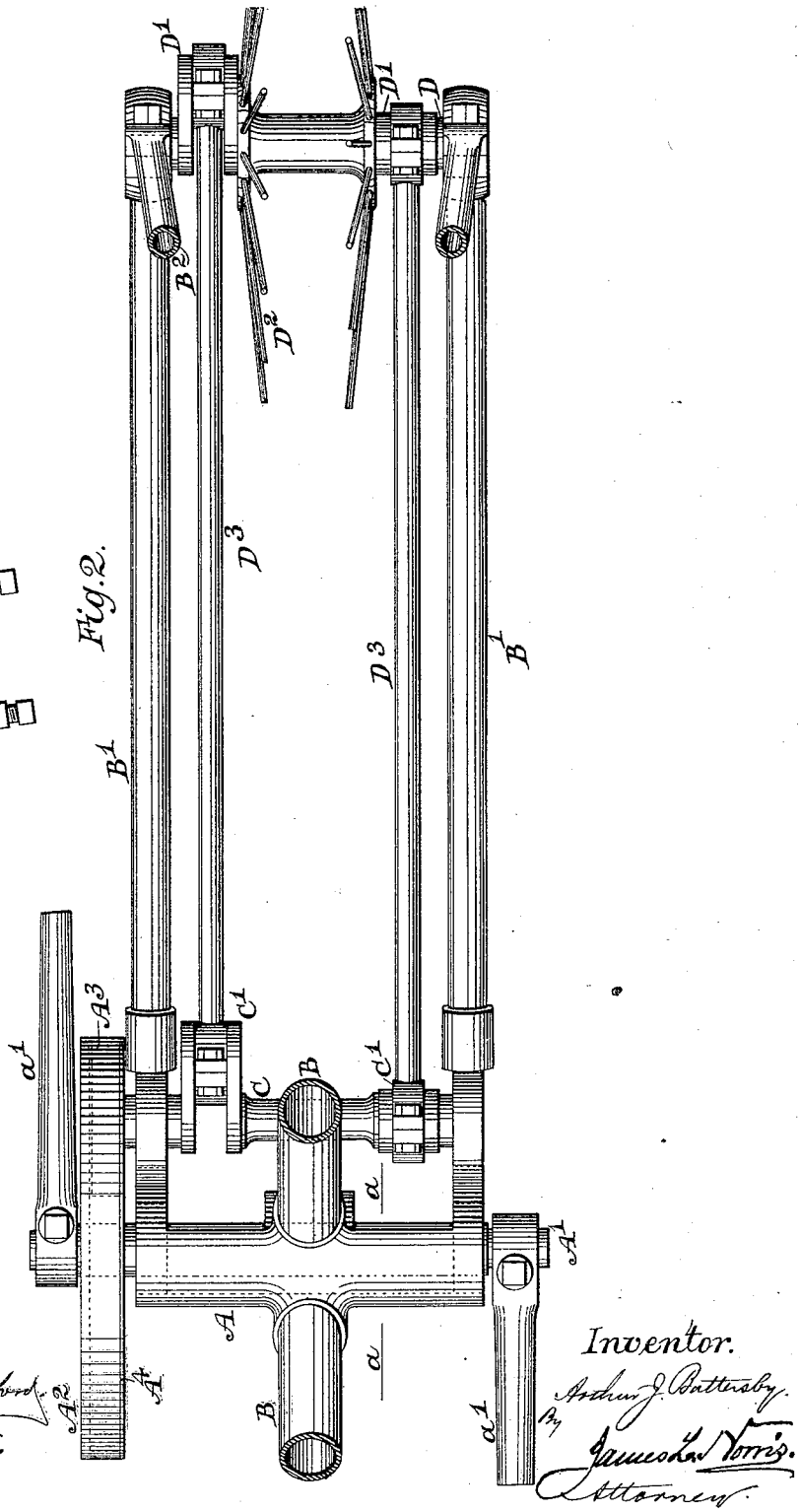
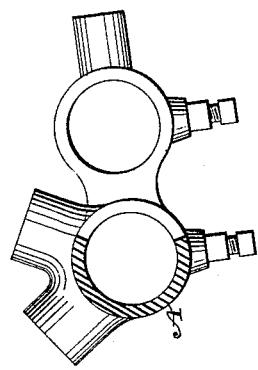
Witnesses:
Inventor.

UNITED STATES PATENT OFFICE.

ARTHUR JOHN BATTERSBY, OF NOTTINGHAM, ENGLAND.

BICYCLE.

SPECIFICATION forming part of Letters Patent No. 480,166, dated August 2, 1892.

Application filed March 7, 1892. Serial No. 424,033. (No model.)

*To all whom it may concern:*

Be it known that I, ARTHUR JOHN BATTERSBY, (of the firm of A. J. Battersby & Sons, feather purifiers,) a subject of the Queen of Great Britain, and a resident of Nottingham, England, have invented certain new and useful Improvements in Bicycles, of which the following is a specification, reference being had to the accompanying drawings.

In the drawings, Figure 1 shows a left side view of my improvements as applied to a Safety bicycle; Fig. 2, a plan of the same. Fig. 3 shows the left side view of a cover-plate, referred to hereinafter. Fig. 4 shows a vertical sectional view of the bracket A, taken on the line $a\,a$, Fig. 2.

I employ a two-armed bracket A, secured to the framing B B of each bicycle. The bracket forms bearings for the pedal-axle A', which is somewhat longer than usual and provided on one side of the bicycle with an interiorly-toothed wheel $A^2$. The arms projecting from the back of the bracket carry bearings for a second axle C, having two cranks C', provided at one end with a toothed spur-wheel $A^3$, gearing into the teeth of the wheel $A^2$. The arms of the bracket are secured to the front ends of the usual framing B' B' of the bicycle. The back ends form bearings for the axle D of the back driving-wheel $D^2$. Between the bearings and the driving-wheel the axle D forms two cranks D', each revolving in a bearing at the back of a connecting-rod $D^3$. The front ends of the rods form bearings in which the cranks C' of the second axle revolve. The back-stays $B^2$ of the bicycle have their lower ends bolted to the bearings at the back ends of the framing B' in the usual way.

To prevent access of dust to the teeth of the wheels $A^2$ $A^3$, I employ a cover-plate $A^4$. A portion of the plate is broken away at Fig. 1 to show the wheels gearing into each other. The plate is provided with two holes, (shown at Fig. 3,) in which the axles A' and C revolve and keep it in position.

The pedal-axle is provided with the usual pedal-arms $a'\,a'$. (Only partly shown at Figs. 1 and 2.) Each revolution of the pedal-axle carrying the wheel $A^2$ causes the wheel $A^3$ and the two cranked axles C and D and driving-wheel $D^2$ to revolve thrice.

By the addition of the above-described parts to a Safety bicycle I am enabled to dispense with the driving-chain and its adjustments heretofore employed and attain a greater speed at each revolution of the pedal-axle.

What I claim is—

1. The combination of a two-armed bracket A with the framing B B and B' B' of a bicycle, the back ends of the framing B' B' forming bearings for the axle D of the driving-wheel $D^2$ of a bicycle.

2. In a bicycle, the combination of a two-armed bracket A, forming bearings for a pedal-axle A', with an axle C, provided with two cranks C', and the pedal-axle carrying a toothed wheel $A^2$, gearing into a wheel $A^3$ on the axle C, both wheels being covered by a plate $A^4$, substantially as described.

3. In a bicycle, the combination, with a pedal-axle, of a two-armed bracket in which said axle is journaled, a second axle C, journaled in the arms of said bracket, a toothed wheel $A^2$, carried by the pedal-axle, a toothed wheel $A^3$, carried by the second axle and gearing with the wheel $A^2$, the cranks C' C', and connections between the same and the driving-wheel, substantially as described.

In testimony whereof I have hereunto signed my name in the presence of two subscribing witnesses.

ARTHUR JOHN BATTERSBY.

Witnesses:
   H. W. GOUGH, *C. E.*,
   JOHN HENRY GOUGH.